(12) United States Patent
Yong et al.

(10) Patent No.: US 10,501,337 B2
(45) Date of Patent: Dec. 10, 2019

(54) SYSTEM FOR NEUTRALIZING THE PH OF EXHAUST CONDENSATE

(71) Applicant: Tenneco Automotive Operating Company Inc., Lake Forest, IL (US)

(72) Inventors: Sun Yong, Ann Arbor, MI (US); Michael C. Bradford, Chelsea, MI (US); Adam J. Kotrba, Laingsburg, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 59 days.

(21) Appl. No.: 15/949,206

(22) Filed: Apr. 10, 2018

(65) Prior Publication Data

US 2019/0308886 A1 Oct. 10, 2019

(51) Int. Cl.

| F01N 3/00 | (2006.01) |
|---|---|
| F01N 13/08 | (2010.01) |
| C02F 1/00 | (2006.01) |
| C02F 1/66 | (2006.01) |
| B01D 53/26 | (2006.01) |

(Continued)

(52) U.S. Cl.
CPC ............ *C02F 1/008* (2013.01); *B01D 53/265* (2013.01); *B01D 53/922* (2013.01); *C02F 1/66* (2013.01); *F01N 3/005* (2013.01); *F01N 13/08* (2013.01); *B01D 53/94* (2013.01); *C02F 2103/18* (2013.01); *C02F 2201/008* (2013.01); *C02F 2209/06* (2013.01); *C02F 2209/38* (2013.01); *F01N 1/00* (2013.01); *F01N 2570/22* (2013.01); *F02B 29/04* (2013.01)

(58) Field of Classification Search
CPC ...... F01N 3/005; F01N 2570/22; C02F 1/008; C02F 1/66; C02F 2103/18; C02F 2201/008; C02F 2209/06

See application file for complete search history.

(56) References Cited

U.S. PATENT DOCUMENTS

| 7,384,454 B2 | 6/2008 | Tongue | |
|---|---|---|---|
| 2004/0079791 A1* | 4/2004 | Kida | C23G 1/00 228/206 |

(Continued)

FOREIGN PATENT DOCUMENTS

| JP | S61-205316 A | 9/1986 |
|---|---|---|
| JP | 2001132442 A | 5/2001 |

(Continued)

*Primary Examiner* — Audrey K Bradley
(74) *Attorney, Agent, or Firm* — Harness, Dickey & Pierce, P.L.C.

(57) ABSTRACT

A water neutralization system that includes a first source of water that is acidic and a second source of water that is basic. A storage reservoir communicates with each of the first source and the second source, and includes a pH sensor that is configured to transmit a signal indicative of a pH of the water stored in the storage reservoir. At least one valve controls fluid communication between the storage reservoir and at least one of the first source and the second source, and a controller communicates with each of the pH sensor and the valve. Based on the signal indicative of the pH of the water stored in the storage reservoir, the controller instructs the valve to adjust an amount of water received from at least one of the first source and the second source to neutralize a pH of the water stored in the storage reservoir.

20 Claims, 5 Drawing Sheets

(51) Int. Cl.
*B01D 53/92* (2006.01)
*B01D 53/94* (2006.01)
*F01N 1/00* (2006.01)
*C02F 103/18* (2006.01)
*F02B 29/04* (2006.01)

(56) References Cited

U.S. PATENT DOCUMENTS

| | | | | |
|---|---|---|---|---|
| 2008/0163832 A1* | 7/2008 | Kume | ................... | F22B 37/025 |
| | | | | 122/235.11 |
| 2011/0168128 A1* | 7/2011 | Bradley | ................... | F01N 3/005 |
| | | | | 123/294 |
| 2017/0306894 A1 | 10/2017 | Kikuchi | | |
| 2017/0342949 A1 | 11/2017 | Kikuchi | | |

FOREIGN PATENT DOCUMENTS

| | | |
|---|---|---|
| JP | 2007059265 A | 3/2007 |
| WO | WO-9934902 A1 | 7/1999 |

* cited by examiner

SYSTEM FOR NEUTRALIZING THE PH OF EXHAUST CONDENSATE

FIELD

The present disclosure relates to a system for neutralizing the pH of an engine exhaust condensate.

BACKGROUND

This section provides background information related to the present disclosure which is not necessarily prior art.

In internal combustion engines, improvements in power and fuel efficiency can be obtained by injecting water into the incoming air or fuel-air mixture. Water injection may also be used to reduce NOx or carbon monoxide (CO) emissions. To inject water into the engine, water condensation can be collected from the engine exhaust, and then re-routed back to an injection system for providing the water to the engine. Water condensation collected from engine exhaust, however, can be acidic and corrosive. Such water, if collected and used for water injection, can corrode the water injection systems.

SUMMARY

This section provides a general summary of the disclosure, and is not a comprehensive disclosure of its full scope or all of its features.

In a first aspect of the present disclosure, there is provided a water neutralization system that includes a first source of water that is acidic and a second source of water that is basic. A storage reservoir communicates with each of the first source and the second source, and includes a pH sensor that is configured to transmit a signal indicative of a pH of the water stored in the storage reservoir. At least one valve controls fluid communication between the storage reservoir and at least one of the first source and the second source, and a controller communicates with each of the pH sensor and the valve. Based on the signal indicative of the pH of the water stored in the storage reservoir, the controller instructs the valve to adjust an amount of water received from at least one of the first source and the second source to neutralize the pH of the water stored in the storage reservoir.

In a second aspect of the present disclosure, there is provided an exhaust treatment system for an internal combustion engine. The system includes an exhaust passage in communication with the internal combustion engine that is configured to carry an engine exhaust produced by the internal combustion engine. An exhaust treatment component is provided in the exhaust passage, and a bypass passage that includes an upstream inlet located upstream from the exhaust treatment component and a downstream inlet located downstream from the exhaust treatment component communicates with the exhaust passage. A separation device is in communication with the bypass passage, and the separation device is configured to receive the portions of the engine exhaust from each of the upstream inlet and the downstream inlet and separate water from each portion of the engine exhaust. Lastly, a storage reservoir is in communication with the separation device for storage of the water separated from the engine exhaust, wherein the water separated from the portion of the engine exhaust that is received by the upstream inlet is acidic and the water separated from the portion of the engine exhaust that is received by the downstream inlet is basic such that the water stored within the storage reservoir is neutralized.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. The example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Figure 1:
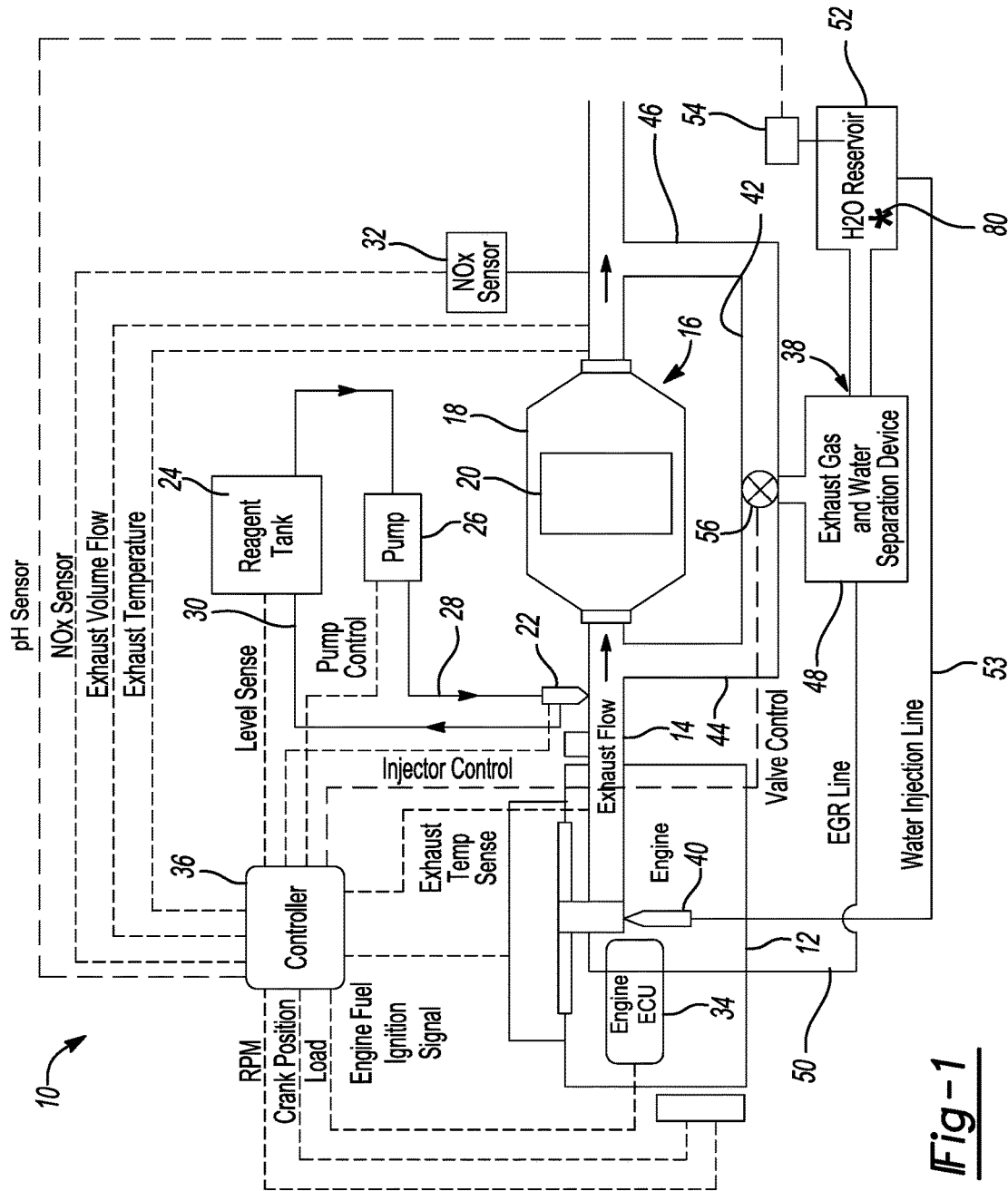
FIG. 1 is a schematic representation of an exhaust system according to a first principle of the present disclosure.

FIG. 1 schematically illustrates an exhaust system 10 according to the present disclosure. Exhaust system 10 can include at least an engine 12 in communication with a fuel source (not shown) that, once consumed, will produce exhaust gases that are discharged into an exhaust passage 14 having an exhaust after-treatment system 16. Downstream from engine 12 can be disposed an exhaust treatment component 18, which can be a DOC (diesel oxidation catalyst), an SCR component, or, as illustrated, a DPF (diesel particulate filter) or GPF (gasoline particulate filter) component 20 that is coated with a three-way catalyst. Although not required by the present disclosure, exhaust after-treatment system 16 can further include components such as a thermal enhancement device or burner 17 to increase a temperature of the exhaust gases passing through exhaust passage 14. Increasing the temperature of the exhaust gas is favorable to achieve light-off of the catalyst in the exhaust treatment component 18 in cold-weather conditions and upon start-up of engine 12, as well as initiate regeneration of the exhaust treatment component 18 when the exhaust treatment component 18 is a DPF or GPF.

To assist in reduction of the emissions produced by engine 12, exhaust after-treatment system 16 can include a dosing module 22 for periodically dosing an exhaust treatment fluid into the exhaust stream. As illustrated in FIG. 1, dosing module 22 can be located upstream of exhaust treatment component 18, and is operable to inject an exhaust treatment fluid into the exhaust stream. In this regard, dosing module 22 includes an injector having an inlet in fluid communication with a reagent tank 24 and a pump 26 by way of inlet line 28 to dose an exhaust treatment fluid such as diesel fuel or urea into the exhaust passage 14 upstream of exhaust treatment component 18. The injector of dosing module 22 may also include an outlet in communication with reagent tank 24 via return line 30. Return line 30 allows for any exhaust treatment fluid not dosed into the exhaust stream to be returned to reagent tank 24. Flow of the exhaust treatment fluid through inlet line 28, dosing module 22, and return line 30 also assists in cooling the injector of dosing module 22 so that dosing module 22 does not overheat. Dosing modules 22 may be configured to include a cooling jacket that passes a coolant around dosing module 22 to cool it.

The amount of exhaust treatment fluid required to effectively treat the exhaust stream can also be dependent on the size of the engine 12. In this regard, large-scale diesel engines used in locomotives, marine applications, and stationary applications can have exhaust flow rates that exceed the capacity of a single dosing module 22. Accordingly, although only a single dosing module 22 is illustrated for urea dosing, it should be understood that multiple dosing modules 22 for urea injection are contemplated by the present disclosure.

The amount of exhaust treatment fluid required to effectively treat the exhaust stream may also vary with load, engine speed, exhaust gas temperature, exhaust gas flow, engine fuel injection timing, desired $NO_x$ reduction, barometric pressure, relative humidity, EGR rate and engine coolant temperature. A $NO_x$ sensor or meter 32 may be positioned downstream from component 20. $NO_x$ sensor 32 is operable to output a signal indicative of the exhaust $NO_x$ content to an engine control unit 34. All or some of the engine operating parameters may be supplied from engine control unit (ECU) 34 via the engine/vehicle databus to an exhaust after-treatment system controller 36. The controller 36 could also be included as part of the engine control unit 34. Exhaust gas temperature, exhaust gas flow and exhaust back pressure and other vehicle operating parameters may be measured by respective sensors, as indicated in FIG. 1.

Figure 2:
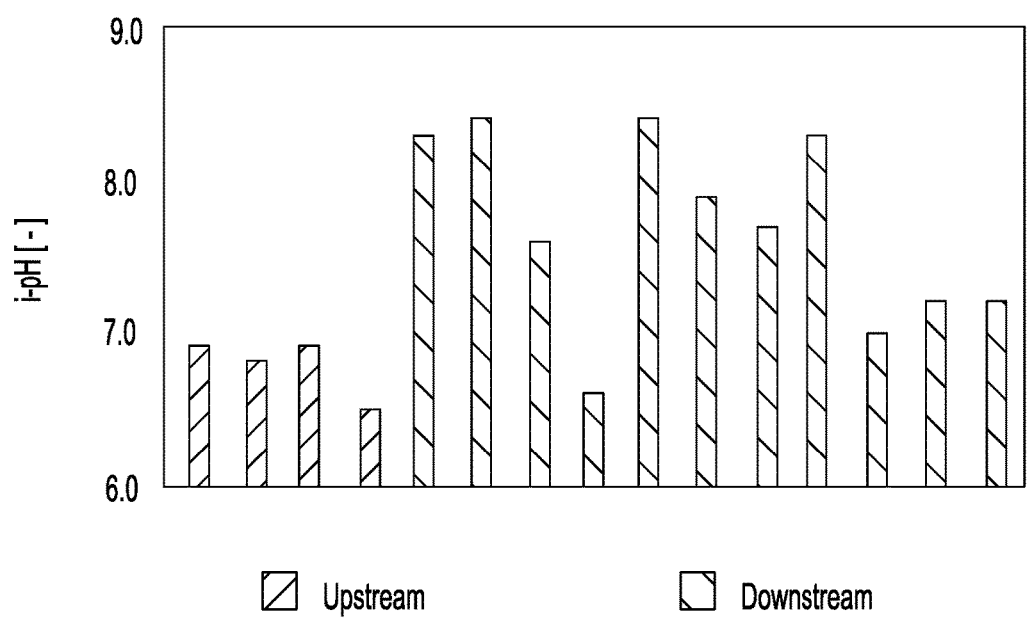
FIG. 2 is a graph illustrating the pH of water that condenses from an engine exhaust located upstream of an exhaust treatment component, and illustrating the pH of water that condenses from an engine exhaust located downstream of the exhaust treatment component.

In accordance with the present disclosure, exhaust system 10 also includes an exhaust gas recirculation and water condensation recovery system 38 that is configured to collect water condensation from the engine exhaust for injection into engine 12 to assist with improvements in power and fuel efficiency, as well as reduce NOx or carbon monoxide (CO) emissions produced by engine 12. As noted above, water that is recovered from the engine exhaust can be acidic such that prolonged use of water recovered from the engine exhaust can corrode components such as an injector 40 that is used to inject water into engine 12 during combustion. It has been learned by the inventors of the present disclosure, however, that water collected from the exhaust downstream of exhaust treatment component 18 is generally basic rather than acidic. Indeed, referring to FIG. 2 of the application, it can be seen that water condensed from engine exhaust received upstream from exhaust treatment component 18 generally has an acidic pH (i.e., less than 7.0), and water condensed from engine exhaust received downstream from exhaust treatment component 18 has a basic pH (i.e., greater than 7.0).

The water collected downstream from exhaust treatment component 18 is generally basic because the filter of exhaust treatment component 18 removes sulfate from the particulate matter in the engine exhaust and the three-way catalyst oxidizes any gaseous organic acids present in the engine exhaust. Thus, if water is collected from the engine exhaust at locations that are located both upstream and downstream from the exhaust treatment component 18, a pH of the collected water can be neutralized to prevent, or at least substantially minimize, the corrosion of the water injection system (e.g., injector 40).

As illustrated in FIG. 1, an exhaust bypass passage 42 includes inlets 44 and 46 that are located upstream and downstream relative to exhaust treatment component 18, respectively. Thus, as the exhaust passes through exhaust passage 14, portions of the engine exhaust will enter bypass passage 42 from each inlet 44 and 46. The exhaust that enters bypass passage 42 is then fed into an exhaust gas and water separation device 48 where water present in the exhaust gas can be condensed and separated from the exhaust gas. Separation device 48 may be, for example, embodied by an exhaust gas recirculation (EGR) cooling apparatus, or any other separation device known to one skilled in the art. The exhaust gas can then be recirculated to engine 12 through EGR line 50.

As separation device 48 cools the exhaust located therein, any gaseous water present in the exhaust will condense to liquid. Alternatively, to further assist with condensation of the water from the exhaust, separation device 48 may include a device such as a cyclone separator (not shown). Regardless, water that is condensed in separation device 48 may then be stored in a condensate reservoir 52 for as-needed injection by water injection system 40, which includes a water injection line 53 that connects reservoir 52 and injector 40. Condensate reservoir 52 may include a pH sensor 54 that is configured to transmit a signal indicative of the pH of the condensed water to controller 36. Alternatively or additionally, pH sensor 54 may communicate with engine ECU 34. Dependent on the pH of the condensed water determined by pH sensor 54, recovery system 38 is configured to adjust the pH of the condensed water held by reservoir 52 as will be described in more detail below.

More particularly, as can be seen in FIG. 1, bypass passage 42 includes a valve 56 that is configured to adjust an amount of the engine exhaust that is received from each inlet 44 and 46. In this regard, valve 56 is configured to allow exhaust gas from each of inlet 44 and 46 to enter separation device 48, allow only exhaust gas from inlet 44 to enter separation device 48, or allow only gas from inlet 46 to enter separation device 48. In this manner, the amount of water that condenses from the engine exhaust in separation device 48 that is either acidic or basic can be controlled to adjust the pH of the condensed water stored in reservoir 52. Further, valve 56 can be controlled by controller 36 or ECU 34 based on the signal indicative of the pH received by controller 36 or ECU 34 from pH sensor 54. For example, if pH sensor 54 determines that the water stored in reservoir 52 is acidic, valve 56 can be controlled to limit or prevent exhaust from inlet 44 from entering separation device 48. Alternatively, if pH sensor 54 determines that the water stored in reservoir 52 is basic, valve 56 can be controlled to limit or prevent exhaust from inlet 46 from entering separation device 48. Thus, the pH of the water stored by reservoir 52 can be dynamically controlled through cooperation of pH sensor 54, controller 36 or ECU 34, and valve 56.

Figure 3:
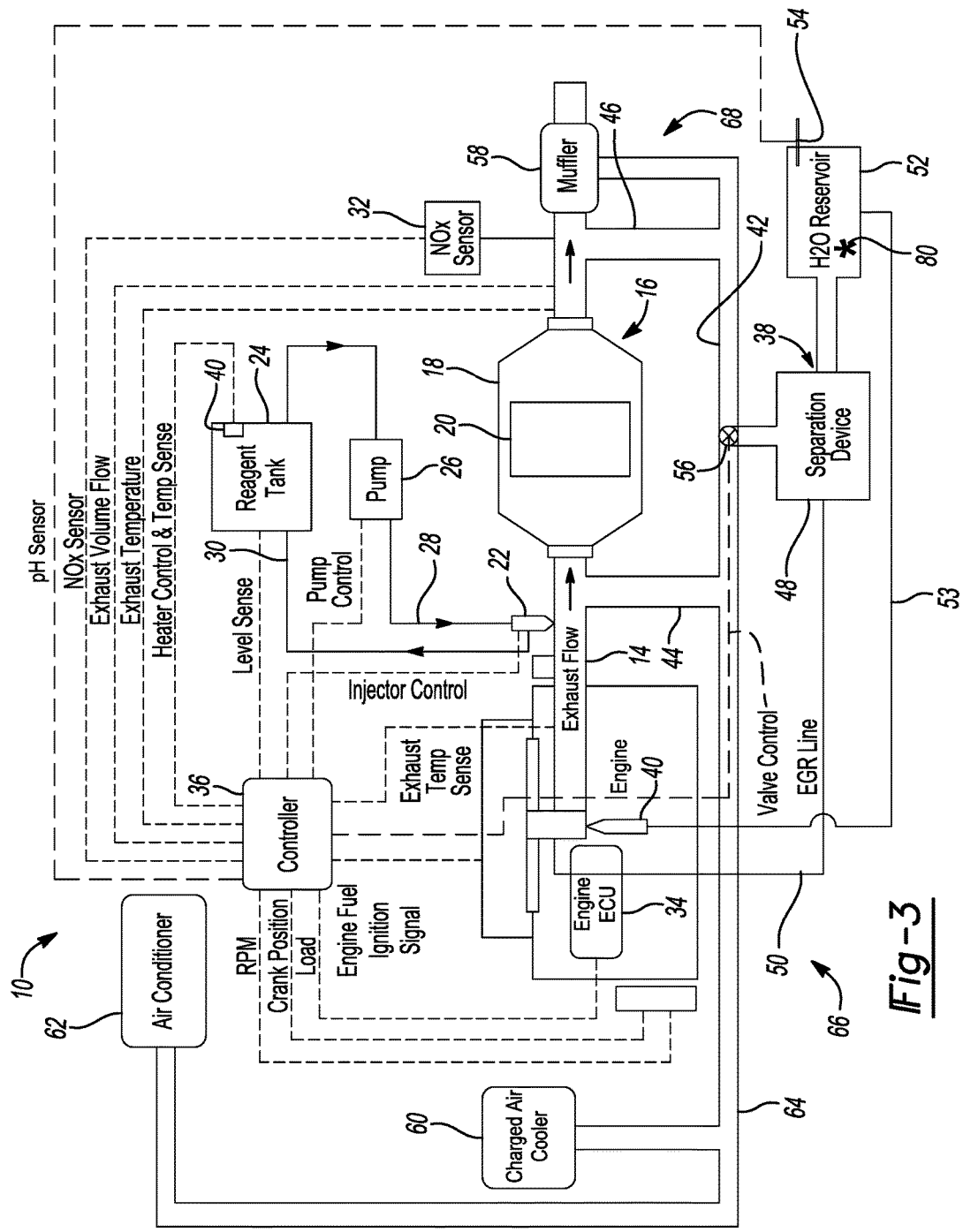
FIG. 3 is a schematic representation of an exhaust system according to a second principle of the present disclosure.

In addition to using water recovered from the engine exhaust that has been neutralized for water injection, exhaust gas recirculation and water condensation recovery system 38 may also be used to condense water from other sources. For example, referring to FIG. 3 of the application, it can be seen that separation device 48, in addition to being in communication with inlets 44 and 46 located upstream and downstream from exhaust treatment component 18, respectively, is also in communication with additional water sources such as muffler 58, charged air cooler 60, and air conditioning system 62. As shown in FIG. 3, upstream inlet 44, downstream inlet 46, muffler 58, charged air cooler 60, and air conditioning system 62 are each in communication with a single conduit 64. It should also be noted that each of these sources are located on a respective acidic side 66 of valve 56 or basic side 68 of valve 56.

For example, water received from charged air cooler 60 and air conditioning system can be acidic and, therefore, these water sources are located on a side 66 of valve 56 that is "acidic" (i.e., on the same side of valve 56 as inlet 44) such that water received from these sources intermixes with the engine exhaust received from inlet upstream 44. Further, water received from muffler 58 is typically basic due to muffler 58 being located downstream from exhaust treatment component 18. Muffler 58, therefore, is located on a side 68 of the valve 56 that is "basic" (i.e., on the same side of valve 56 as inlet 46) such that water received from muffler 58 intermixes with the engine exhaust received from downstream inlet 46.

The water and engine exhaust from each of the acidic side 66 and basic side 68 of the valve 56 enters separation device 48 where any gaseous water in the exhaust cools and condenses to liquid, which is then stored in condensate reservoir 52 for as-needed injection by water injection system including water injection line 53 that connects reservoir 52 and injector 40. Similar to the embodiment illustrated in FIG. 1, condensate reservoir 52 may include a pH sensor 54 that is configured to transmit a signal indicative of a pH of the condensed water to controller 36 or ECU 34. Dependent on the pH of the condensed water determined by pH sensor 54, recovery system 38 is configured to adjust the pH of the condensed water held by reservoir 52 in the same manner as the first embodiment. That is, valve 56 can be controlled to allow or prevent water and exhaust from either the acidic side 66 or basic side 68 of valve 56 from entering separation device 48 and subsequently reservoir 52. Thus, the pH of the water stored by reservoir 52 can be dynamically controlled through cooperation of pH sensor 54, controller 36 or ECU 34, and valve 56.

It should be understood that the illustration of muffler 58, charged air cooler 60, and air conditioning system 62 are merely example water sources that can be used to neutralize the pH of water held by reservoir 52, and the present disclosure should not be limited thereto as other additional sources are contemplated. For example, if engine 12 is a stationary system, an additional source of water than can be used is rain water that is collected and fed to separation device 48 and then reservoir 52. Further, any additional systems of engine 12 or its surrounding environment that can produce water can be used without departing from the scope of the present disclosure.

Figure 4:
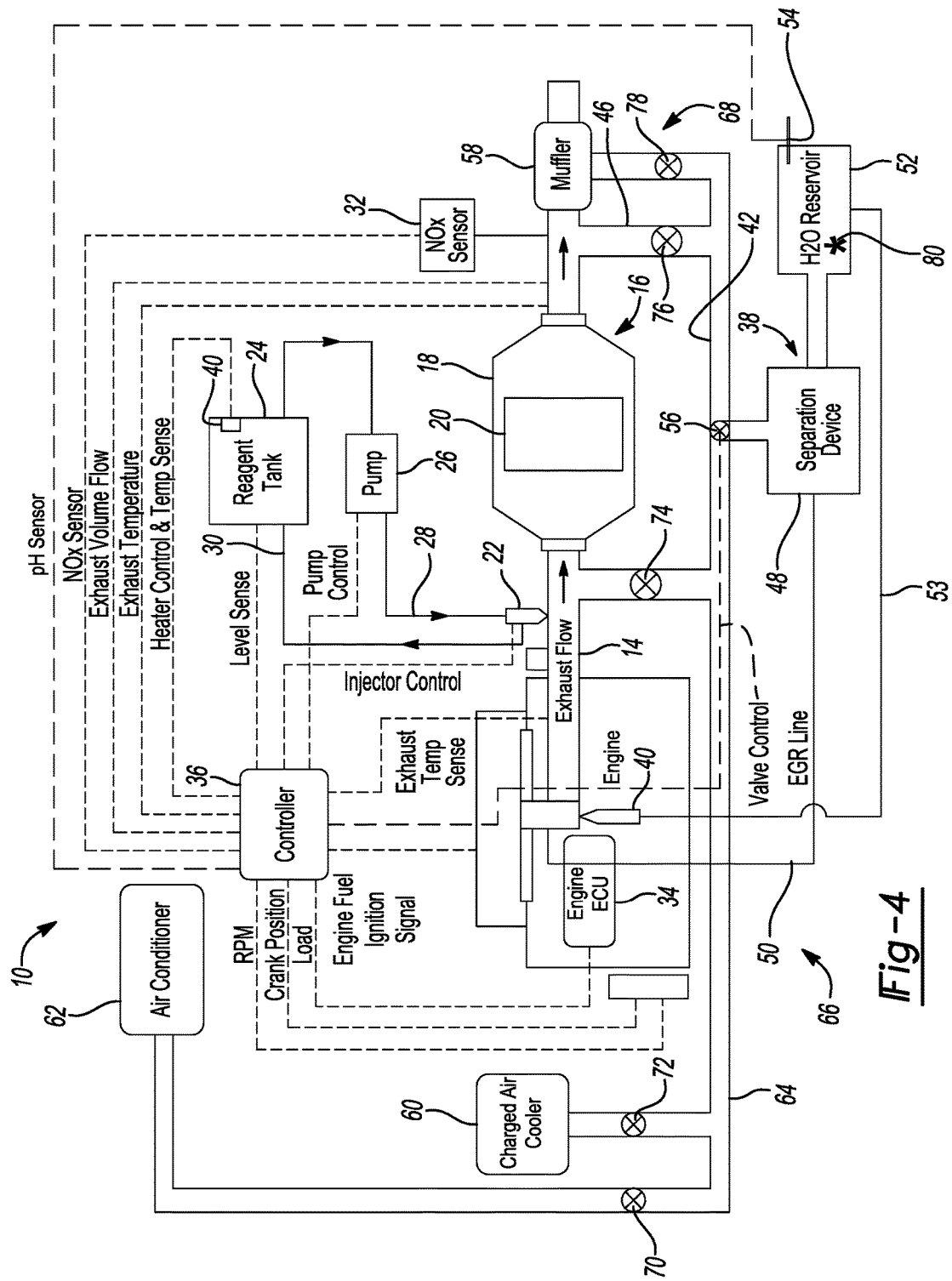
FIG. 4 is a schematic representation of an exhaust system according to a third principle of the present disclosure.

FIG. 4 illustrates an exhaust treatment system that is a variation of the system shown in FIG. 3. In this regard, it should be noted that each source of water has an independently controllable valve that is configured to control whether water from a respective source may be received by separation device 48. That is, air conditioning system 62 includes a valve 70, charged air cooler 60 includes a valve 72, upstream inlet 44 includes a valve 74, downstream inlet 46 includes a valve 76, and muffler 58 includes a valve 78. Although not illustrated in FIG. 4, it should be understood that each of the valves 72-78 can be controlled by controller 36 or ECU 34 to allow or prevent water from each these sources to communicate with separation device 48. Further, it should be understood that valve 56 is optional in this configuration.

Similar to the embodiments illustrated in FIGS. 1 and 3, condensate reservoir 52 may include a pH sensor 54 that is configured to transmit a signal indicative of the pH of the condensed water to controller 36 or ECU 34. Dependent on the pH of the condensed water determined by pH sensor 54, recovery system 38 is configured to adjust the pH of the condensed water held by reservoir 52 in the same manner as the first and second embodiments. That is, valves 56 and 72-79 can be controlled to allow or prevent water and exhaust from either the acidic side 66 or basic side 68 of valve 56 from entering separation device 48 and subsequently reservoir 52. Thus, the pH of the water stored by reservoir 52 can be dynamically controlled through cooperation of pH sensor 54, controller 36 or ECU 34, and valves 56 and 72-78.

It should be understood that although only a single separation device 48 is illustrated in FIG. 4, the present disclosure should not be limited thereto. In this regard, each water source 44, 46, 58, 60, and 62 may have a respective separation device 48 that communicates with reservoir 52. Moreover, because the reaction and mixing of acidic and basic water does not occur instantaneously, it should be understood that reservoir 52 can include either a passive or active mixing device 80 that is configured to decrease the time needed to properly intermix the acidic and basic water to provide water with neutralized pH for water injection.

To demonstrate feasibility of each of the above designs, a simplified analysis tool was developed to calculate the amount of acidic water and basic water will be needed to yield a pH neutral mixture of water. The analysis assumes that the acidic solution is hydrochloric acid (HCl) and that the basic solution sodium hydroxide (NaOH). During mixture of these materials, the following neutralization occurs to completion:

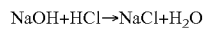

$$NaOH+HCl \rightarrow NaCl+H_2O$$

Figure 5:
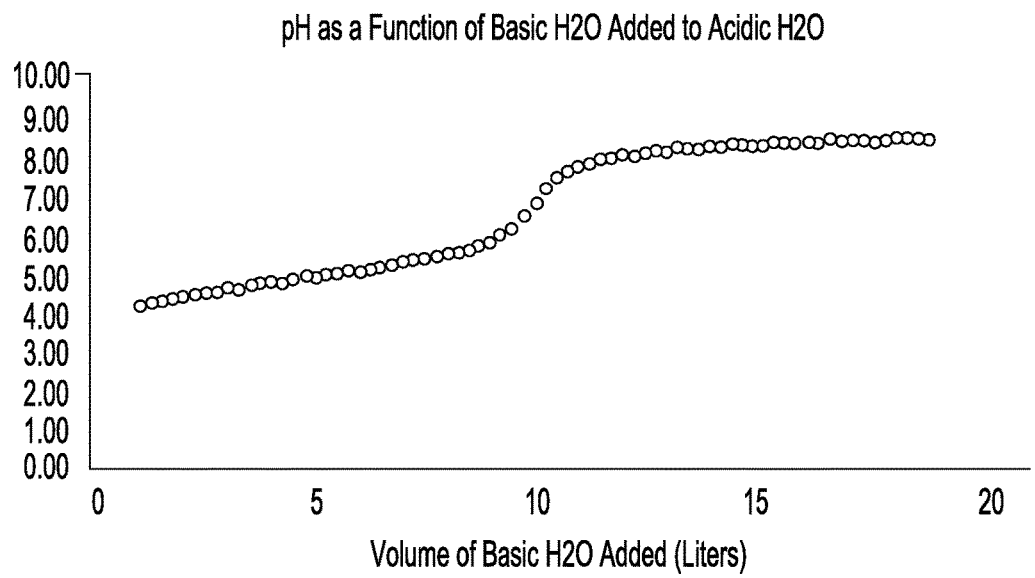
FIGS. 5 and 6 graphically illustrate the amount of basic water that may be required to neutralize one liter of acidic water.
Figure 6:
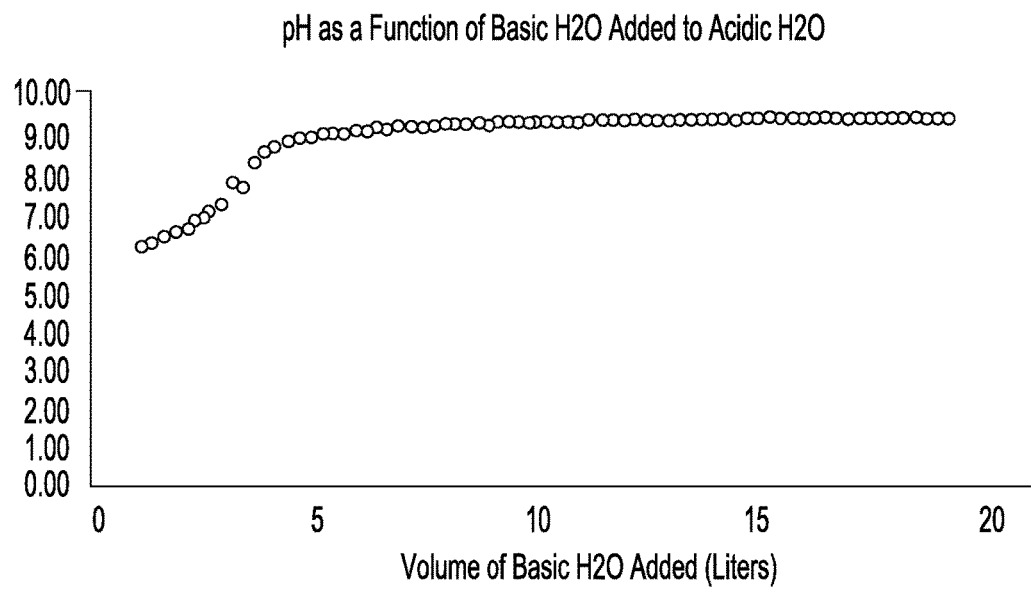

With the above in mind, it was calculated that if one liter of acidic solution having a pH of 4 is mixed with a basic solution having a pH of 9, it will require about ten times more basic water (i.e., ten liters) to neutralize the pH (i.e., pH=7) of the mixture. Please see, for example, FIG. 5 where the pH of the mixture at various amounts of the basic solution is illustrated. Further, as another example, if the acidic water has a pH of 5 and the basic water has a pH of 8.5, the amount of basic water to neutralize the acidic water is only three times as great as the amount of acidic water. See, for example, FIG. 6. Although neutralization of water though mixing of acidic and basic solutions will not be as straightforward as set forth in each of the examples about due to various factors, the above examples clearly illustrate that the relative amounts of acidic and basic water will require adjustment using a system that is dynamically controlled like the systems illustrated and described in FIGS. 1, 3, and 4. Further, in light of the relatively different amounts of each of the acidic and basic water that may be required for neutralization, it should be understood that each of the above embodiments may include a solid acid source and a solid base source where acidic and basic pellets (e.g., NaOH) can be fed to reservoir 52, as needed.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A water neutralization system, comprising:
    a first source of water that is acidic;
    a second source of water that is basic;
    a storage reservoir in communication with each of the first source of water and the second source of water, the storage reservoir including a pH sensor or meter that is configured to transmit a signal indicative of a pH of the water stored in the storage reservoir;
    at least one valve that controls fluid communication between the storage reservoir and at least one of the first source and the second source; and
    a controller that communicates with each of the pH sensor or meter and the at least one valve,
    wherein, based on the signal indicative of the pH of the water stored in the storage reservoir, the controller is configured to instruct the at least one valve to adjust an amount of water received from at least one of the first source and the second source to neutralize a pH of the water stored in the storage reservoir.

2. The water neutralization system according to claim 1, further comprising an exhaust passage in communication with an internal combustion engine that carries an engine exhaust that includes water; and
    a separation device that condenses the water from the engine exhaust, the separation device being in communication with the storage reservoir.

3. The water neutralization system according to claim 2, wherein the exhaust passage includes an exhaust treatment component, and a bypass passage in communication with the exhaust passage and the separation device, the bypass passage including an upstream inlet located upstream from the exhaust treatment component and a downstream inlet located downstream from the exhaust treatment component that each communicate portions of the exhaust from upstream of the exhaust treatment component and downstream from the exhaust treatment component to the separation device.

4. The water neutralization system according to claim 3, wherein the first source of water that is acidic is the water in the engine exhaust that is communicated to the separation device from the upstream inlet of the bypass passage.

5. The water neutralization system according to claim 4, wherein the second source of water that is basic is the water in the engine exhaust that is communicated to the separation device from the downstream inlet of the bypass passage.

6. The water neutralization system according to claim 5, wherein the at least one valve is located in the bypass passage, and the at least one valve is configured to control flow of the engine exhaust into the separation device from each of the upstream inlet and the downstream inlet.

7. The water neutralization system according to claim 3, wherein the second source of water that is basic is the water in the engine exhaust that is communicated to the separation device from the downstream inlet of the bypass passage.

8. The water neutralization system according to claim 7, wherein the first source of water is at least one of a charged air cooler or an air conditioning system that communicates with the separation device.

9. The water neutralization system according to claim 8, further comprising another valve between the second source of water and the separation device.

10. The water neutralization system according to claim 9, wherein, based on the signal indicative of the pH of the water stored in the storage reservoir, the controller is configured to instruct the another valve to adjust an amount of water received from the first source to neutralize the pH of the water stored in the storage reservoir.

11. An exhaust treatment system for an internal combustion engine, comprising:
    an exhaust passage in communication with the internal combustion engine and configured to carry an engine exhaust produced by the internal combustion engine;
    an exhaust treatment component provided in the exhaust passage;
    a bypass passage that includes an upstream inlet located upstream from the exhaust treatment component and a downstream inlet located downstream from the exhaust treatment component, each of the upstream inlet and downstream inlet configured for receipt of a portion of the engine exhaust therein;
    a separation device in communication with the bypass passage that is configured to receive the portions of the engine exhaust from each of the upstream inlet and the downstream inlet, the separation device configured to separate water from each portion of the engine exhaust; and
    a storage reservoir in communication with the separation device for storage of the water separated from the engine exhaust,
    wherein the water separated from the portion of the engine exhaust that is received by the upstream inlet is acidic and the water separated from the portion of the engine exhaust that is received by the downstream inlet is basic such that the water stored within the storage reservoir is neutralized.

12. The exhaust treatment system according to claim 11, wherein the storage reservoir includes a pH sensor or meter that is configured to transmit a signal indicative of a pH of the water stored in the storage reservoir.

13. The exhaust treatment system according to claim 12, further comprising a valve located in the bypass passage that is configured to control flow of the engine exhaust into the separation device from each of the upstream inlet and the downstream inlet.

14. The exhaust treatment system according to claim 13, further comprising a controller that communicates with each of the pH sensor or meter and the valve.

15. The exhaust treatment system according to claim 14, wherein, based on the signal indicative of the pH of the water stored in the storage reservoir, the controller is configured to instruct the valve to adjust the portions of the engine exhaust received by the separation device from each of the upstream inlet and the downstream inlet to adjust the pH of the water stored in the storage reservoir.

16. The exhaust treatment system according to claim 11, further comprising an exhaust gas recirculation line in communication with the separation device for directing the engine exhaust from the separation device to the internal combustion engine.

17. The exhaust treatment system according to claim 11, further comprising an injection system that provides fluid communication between the storage reservoir and the internal combustion engine.

18. The exhaust treatment system according to claim 11, further comprising at least one additional source of water in communication with the separation device.

19. The exhaust treatment system according to claim 18, wherein the at least one additional source of water is at least one of a charged air cooler, an air conditioning system, and a muffler.

20. The exhaust treatment system according to claim 18, further comprising another valve between the additional source of water and the separation device for controlling fluid communication between the additional source of water and the separation device.

\* \* \* \* \*